(12) United States Patent
Eden

(10) Patent No.: US 11,949,278 B1
(45) Date of Patent: Apr. 2, 2024

(54) FAST-CHARGING BATTERY

(71) Applicant: Gideon Eden, Woburn, MA (US)

(72) Inventor: Gideon Eden, Woburn, MA (US)

( * ) Notice: Subject to any disclaimer, the term of this patent is extended or adjusted under 35 U.S.C. 154(b) by 1 day.

(21) Appl. No.: 18/185,349

(22) Filed: Mar. 16, 2023

(51) Int. Cl.
| H01M 10/44 | (2006.01) |
| H01M 10/42 | (2006.01) |
| H01M 10/46 | (2006.01) |
| H01M 10/48 | (2006.01) |
| H02J 7/00 | (2006.01) |
| H02J 7/34 | (2006.01) |

(52) U.S. Cl.
CPC ............ *H02J 7/345* (2013.01); *H01M 10/425* (2013.01); *H01M 10/46* (2013.01); *H01M 10/486* (2013.01); *H02J 7/0019* (2013.01); *H01M 2010/4271* (2013.01); *H01M 2010/4278* (2013.01)

(58) Field of Classification Search
CPC ...... H02J 7/345; H02J 7/0019; H01M 10/425; H01M 10/486; H01M 10/46; H01M 10/44; H01M 2010/4278; H01M 2010/4271
USPC ........ 320/104, 107, 109, 114, 116, 118, 122, 320/150, 112
See application file for complete search history.

(56) References Cited

U.S. PATENT DOCUMENTS

| 4,007,817 A | 2/1977 | Bolger, Jr. |
| 4,139,071 A | 2/1979 | Tackett |
| 5,311,973 A | 5/1994 | Tseng et al. |
| 5,669,470 A | 9/1997 | Ross |
| 5,821,728 A | 10/1998 | Schwind |
| 6,421,600 B1 | 7/2002 | Ross |
| 8,860,421 B2 * | 10/2014 | Heo .......................... B60L 58/15 324/433 |
| 10,131,238 B2 | 11/2018 | Ricci |
| 10,449,865 B2 | 10/2019 | Rumbak |

(Continued)

FOREIGN PATENT DOCUMENTS

| CN | 109606147 A | 4/2019 |
| EP | 289868 A2 | 11/1988 |

(Continued)

OTHER PUBLICATIONS

Translation of WO-2021010388-A1 (Year: 2021).*

*Primary Examiner* — Edward Tso
(74) *Attorney, Agent, or Firm* — Gallium Law; Wesley Schwie; Stanton Braden

(57) ABSTRACT

A battery is provided that uses supercapacitors and battery cells connected by switches among themselves and to input and output terminals via multiplexed selection under the control of a microprocessor or microcontroller. The supercapacitors and battery cells of the battery may independently, or in combination, power an electric vehicle. The battery may be operated in several modes, at least one of which may be used to power an electric vehicle long enough to reach a charging station in connection with charge on the battery cells being partially or almost completely depleted. The battery may also deliver charge while the battery cells and or the supercapacitors are being charged. Further, the battery may be fast charging on-the-run in that the supercapacitors may be charged faster that the battery cells permitting an electric vehicle to be powered without spending considerable time, that would otherwise be required at a conventional charging station with traditional batteries.

20 Claims, 7 Drawing Sheets

(56) References Cited

U.S. PATENT DOCUMENTS

2011/0031047 A1  2/2011  Tarr
2022/0255348 A1  8/2022  Afridi

FOREIGN PATENT DOCUMENTS

| GB | 2461578 A2 | 1/2010 | |
|---|---|---|---|
| GB | 2566686 A | 3/2019 | |
| WO | 2011046400 A2 | 4/2011 | |
| WO | 2017209736 A1 | 12/2017 | |
| WO | 2021010388 A1 | 1/2021 | |
| WO | WO-2021010388 A1 * | 1/2021 | ............ H02J 7/0014 |

* cited by examiner

FAST-CHARGING BATTERY

BACKGROUND

The majority of electric vehicles (EVs) currently on the market use lithium-ion batteries. Lithium-ion batteries offer a high energy density, which allow for a long driving range, and are relatively lightweight, making them a suitable option for use in EVs.

There are several different types of lithium-ion battery chemistries, each with its own specific characteristics and advantages. Some of the most common types of lithium-ion battery chemistries used in EVs include the following: lithium iron phosphate (LFP) batteries; nickel manganese cobalt oxide (NMC) batteries; and nickel and cobalt aluminum oxide (NCA) batteries.

LFP batteries are known for their stability and safety, as they are less likely to overheat or catch fire compared to other types of lithium-ion batteries. However, they have a lower energy density, meaning they are less efficient and result in a shorter driving range for EVs.

NMC batteries offer a good balance between energy density and stability, making them a popular choice for use in EVs.

NCA batteries have a high energy density, allowing for a longer driving range in EVs. However, they are also more expensive and less stable compared to other types of lithium-ion batteries.

In addition to lithium-ion batteries, some EV manufacturers are experimenting with other types of battery chemistries, including solid-state batteries, which offer improved safety and energy density compared to traditional lithium-ion batteries. However, solid-state batteries are still in the early stages of development and are not yet widely used in commercial EVs.

As battery technology continues to evolve and improve, new types of battery chemistries are being developed and tested for use in EVs. The specific type of battery chemistry used in an EV can depend on various factors, including cost, energy density, safety, and range.

Much battery technology development efforts focus on the rapid charging of lithium-ion batteries. However, several challenges and potential problems occur with battery charging.

Thermal management issues are often presented when attempting to rapidly charge a battery. Rapid charging generates more heat, as compared with slower charging methods. Heat can negatively affect the performance and lifespan of a battery. Consequently, proper thermal management is crucial to ensuring that a battery operates within safe temperature ranges.

High charging rates can lead to a faster degradation of the battery, reducing its capacity and overall performance over time.

Rapid charging can also result in voltage instability, leading to potential safety issues such as thermal runaway, which is a rapid increase in temperature that can cause the battery to catch fire.

The efficiency of rapid charging can be lower than slower charging methods, leading to longer charging times or increased energy loss during the charging process.

As rapid charging systems, as compared with slower charging systems, can be more expensive to develop and implement, they may tend to result in higher costs for manufacturers and consumers. High charging and discharge rates can also result in a shorter overall battery lifetime, leading to the need for more frequent replacements and increased costs for consumers.

Capacitors can be used in electric vehicles (EVs) as a means of energy storage and energy delivery in an electric motor. They can complement or replace the traditional lithium-ion batteries that are commonly used in EVs. Supercapacitors, also known as ultracapacitors, may be ideally suited for these roles as they may store a much higher amount of energy and electric charge than conventional capacitors. For instance, supercapacitors may have capacitances that are as high as 12,000 Farads. They may be used to provide the necessary power for vehicle acceleration and vehicle regenerative braking. They have high power density, meaning they can deliver high levels of power in a short amount of time, and they can be charged and discharged many times without losing their ability to store energy. As such, when the EV's electric motor needs a quick burst of power, such as during acceleration, the energy stored in the capacitors may be quickly released to provide the necessary power. During regenerative braking, the energy generated by the braking process can be quickly stored in the capacitors and be ready to be used when needed. This use of capacitors in EVs may result in several benefits, including improved acceleration and regenerative braking, increased efficiency, and reduced wear and tear on the battery. Additionally, capacitors have a longer lifespan and are more tolerant to extreme temperatures than traditional batteries, making them a promising option for use in EVs. However, capacitors still have limitations compared to batteries, such as lower energy density and higher cost. As a result, capacitors are often used in combination with batteries in EVs, rather than as a complete replacement.

A need exists to provide the benefits of a battery (or batteries) in specific distributive combination with supercapacitors to address some of the foregoing problems noted herein concerning charging of electric vehicles and similarly powered apparatus.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

Reference numbers/symbols have been carried forward.

Embodiments of the present invention and their advantages may be understood by referring to FIGS. 1-7.

DETAILED DESCRIPTION

A system is disclosed herein that, in one or more embodiments, may serve as a direct replacement for an electric vehicle battery (EVB) that is currently used to power the electric motor of a battery electric vehicle or a hybrid electric vehicle. The system disclosed herein for replacing an EVB may have a combination of supercapacitors and electric battery cells configured for multiplexed selection for use by switches operated by a multiplexer controlled by a micro-controller or microprocessor.

In some embodiments, multiplexed selection, by a microcontroller or microprocessor, connecting via switches, ones from a group of supercapacitors and/or ones from a group of battery cells may be accomplished in connection with carrying out an operational powering scheme that may include optimization of one or more operational characteristics.

Figure 1:
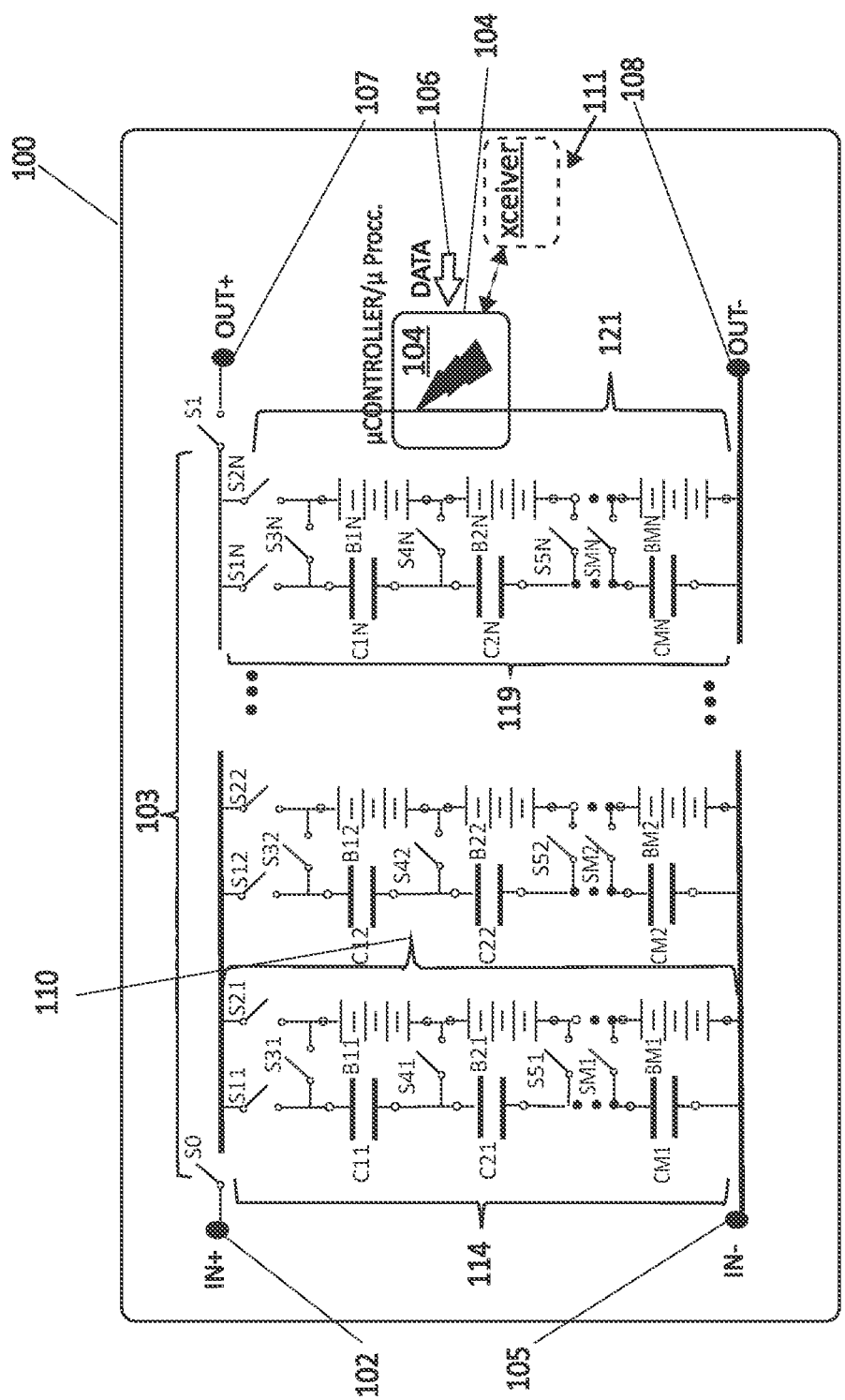
FIG. 1 is a schematic diagram illustrating a battery having an array of battery cells and capacitors.

FIG. 1 is a schematic diagram illustrating battery 100 having array 103 of battery cells and capacitors. Further, FIG. 1 illustrates battery cells (denoted as B followed by an indexed number), a group of capacitors (denoted as C followed by an indexed number) and a group of switches, denoted as S followed by an index number connecting ones of battery cells and or capacitors via ones of the switches as controlled by a processor such as microcontroller/microprocessor 104. Switches referenced herein may be field effect transistors (FETs), metal oxide semiconductor field effect transistors (MOSFETs), bipolar transistors power MOSFETs and combinations thereof. Microcontroller/microprocessor 104 controls the state of each switch, based upon streaming data information 106 which may include the total remaining energy in the electrochemical cells, the total remaining energy in the capacitors, and the real time energy requirement of the external device.

Battery 100 may have, for instance, two differential input terminals 102 and 105 denoted IN+ and IN−, respectively, and two differential output terminals 107 and 108 denoted OUT+ and OUT−, respectively.

As shown in FIG. 1, battery cells are labeled "B" along with a consecutively indexed row number and a consecutively indexed column number of an array. For example: B11 through BM1, (for FIG. 1, with M herein throughout being an integer ≥3), represent batteries along rows 1 through M (each row number represented by a consecutively indexed number) in the first column of the array; B12 through BM2 represent battery cells along rows 1 through M in the second column of batteries in array 103; and B1N through BMN represent battery cells along rows 1 through M in the Nth column of batteries in array 103 (for FIG. 1, N herein throughout being an integer ≥3). The configuration shown in FIG. 1 (without any of the switches being thrown) illustrates battery cells in each column being connected in series.

As shown in FIG. 1, capacitors are labeled "C" along with a consecutively indexed row number and a consecutively indexed column number of an array. For example: C11 through CM1, represent capacitors along rows 1 through M (each row number represented by a consecutively indexed number) in the first column of capacitors of array 103; C12 through CM2 represent capacitors along rows 1 through M in the second column of array; and C1N through CMN represent capacitors along rows 1 through M in the Nth column capacitors of array 103. The configuration shown in FIG. 1 (without any of the switches being thrown) illustrates capacitors in each column being connected in series.

Capacitor switches S11 through S1N may be thrown in order to connect corresponding columns of capacitors with differential input terminal 102 through thrown switch S0, the capacitor switches being indexed to reflect a capacitor array row number followed by a capacitor array column number. For instance, switch S11, when closed, connects capacitors, starting with capacitor C11, in first column of capacitors 114 to differential input terminal 102 through a closed thrown switch S0 (shown in FIG. 1 as being open). Likewise, switch S1N, when closed, connects capacitors, starting with capacitor C1N, in Nth column 119 of capacitors of array 103 to differential input terminal 102 through a closed thrown switch S0.

Battery switches S21 through S2N may be thrown in order to connect corresponding columns of battery cells with differential input terminal 102 through thrown switch S0. For instance, switch S21, when closed, connects battery cells, starting with battery cell B11, in first column of batteries 110 to differential input terminal 102 through a closed thrown switch S0. Likewise, switch S2N, when closed, connects battery cells, in the Nth column of capacitors 121 starting with battery cell B1N, to differential input terminal 102 through a closed thrown switch S0.

Switches indexed starting with a first number, ranging from 3 to N, indicating array row, and having a second number indexed between 1, 2 and N, indicating array column, correspond to switches that may connect a plate of a capacitor to an associated plate of a battery cell along a given row of an array of battery cells and capacitors. For instance, switches S31 through SM1 connect associated ones of capacitors in a first column of capacitors to associated battery cells in an array of a column of battery cells. For instance, switch S31, when closed (shown in FIG. 1 as being open) connects a plate of capacitor C11 to a terminal of battery cell B11. Likewise, switch S41, when closed, connects another plate of battery cell B11 to a location connected to and between capacitors C11 and C21 (C21 being in a second row of an array of capacitors). Similarly, switch SM1, when closed (shown in FIG. 1 as being open) connects a plate of capacitor CM1 (in the Mth row of an array of capacitors) to a terminal of battery cell BM1.

Switch S1 (shown as open in FIG. 1) may be thrown to connect combinations of batteries and capacitors to output 107.

Figure 2:
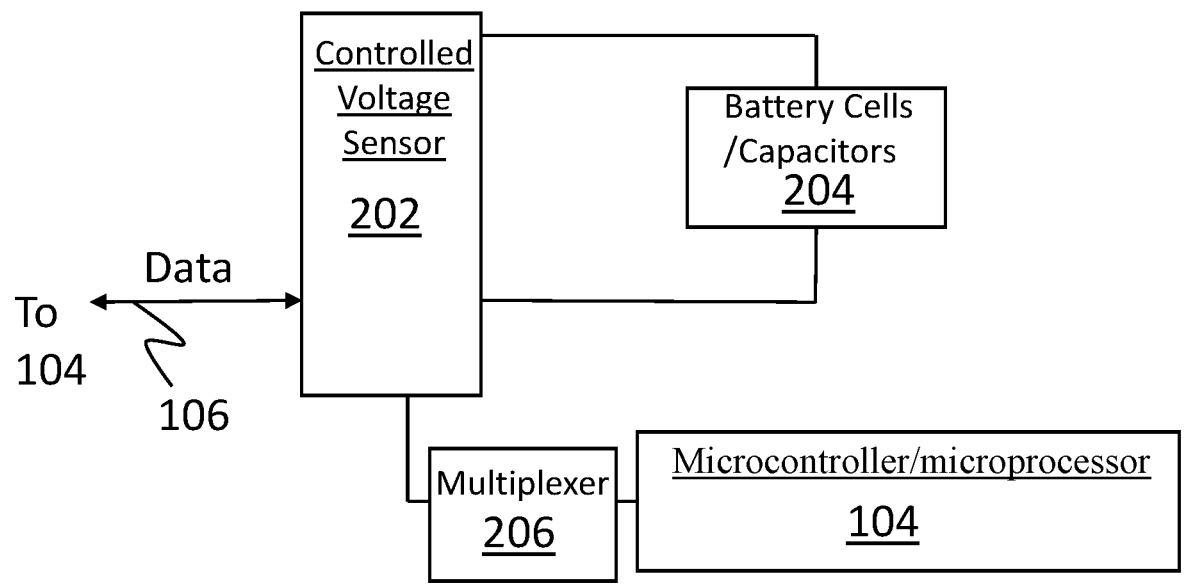
FIG. 2 illustrates a diagram showing a microprocessor coupled to a controlled voltage sensor across an element that may represent one or more of the capacitors or battery cells shown in FIG. 1.

FIG. 2 illustrates a diagram showing microprocessor 104 coupled to controlled voltage sensor 202 (that may determine voltage) across element 204 that may represent one or more of the capacitors or battery cells shown in FIG. 1. Controlled voltage sensor 202 may represent a single voltage measuring device for some embodiments. Alternatively, controlled voltage sensor 202 may be representative of many discrete controlled voltage sensors adapted to measure voltage across associated battery cells and/or capacitors in array 103 of FIG. 1. In some embodiments, controlled voltage sensor 202 may be representative of a controlled voltage sensor used in connection with multiplexed selection by multiplexer 206 as controlled by microcontroller/microprocessor 104 in connection with measuring voltage across various batteries and capacitors as selected by microcontroller/microprocessor 104 via one or more switches such as the switches shown in FIG. 1.

Powering schemes, in particular, for an EV may be accomplished through combinations of battery cells and capacitors through the various switches described herein as controlled by microcontroller/microprocessor 104. Exemplary powering schemes are discussed herein in the connection with the following examples:

Example 1

In a scenario where battery cell charge has been depleted, switch configurations may be chosen by microcontroller/microprocessor 104 so that battery 100 provides charge only through the capacitors. Microcontroller/microprocessor 104 may be programmed to cause controlled voltage sensor 202 to secure, in a multiplexed manner using the switches shown in FIG. 1, measurements of various battery cells and various capacitors in array 103 of FIG. 1. Should, for instance, detection, using controlled voltage sensor 202, indicative of a level of battery cell charge below a given threshold level, may prompt microcontroller/microprocessor 104 to cause a switch configuration that may allow an EV to operate using only capacitors. The capacitors contemplated for use herein throughout are supercapacitors. This configuration may be particularly useful in cases where battery cells are depleted of energy and capacitors may be relied upon in order to navigate an EV to a charging station.

The voltage sensors may provide a role in the operational life span of an EV battery. At some point in time, individual battery cells may deteriorate chemically and develop internal shorts or disconnections. Since each battery cell (or group of battery cells) voltage can be monitored by a sensor (or group of sensors), data sent to a microcontroller/microprocessor 104 can activate disconnection of faulty battery cells from the circuit. For example, in FIG. 1, additional switches may be embedded in parallel to each battery cell, which will provide electrical current path if the battery cell becomes electrically disconnected. In that case, battery cells from an associated column may still be active with somewhat reduced column voltage compared with and compensated by another column of battery cells. For better safety, if a battery cell catches fire, the processor (microcontroller/microprocessor 104) can deactivate sections of the battery (100) to avoid an avalanche of other cells catching fire. Additional temperature sensors may be used to monitor these hazardous conditions, and provide an additional security blanket, in an effort to provide self-cure of the battery by extending its life span.

Figure 3:
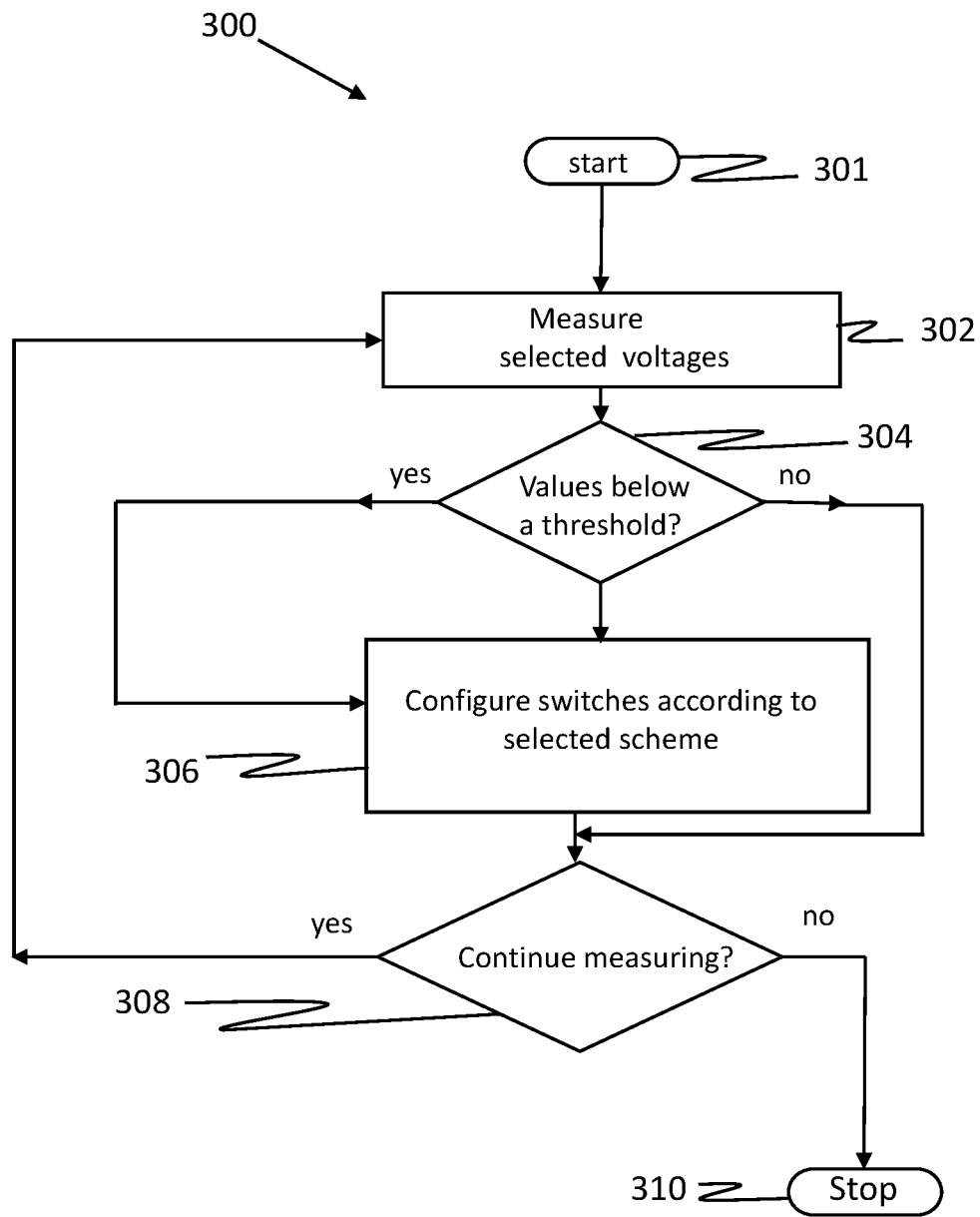
FIG. 3 is a flowchart illustrating the process described in connection with Example 1.

FIG. 3 is a flowchart illustrating the process described in connection with Example 1. Process 300 starts at step 301. Microcontroller/microprocessor 104 of FIG. 1 causes selected voltage readings to be taken of selected battery cells and/or capacitors by controlled voltage sensor 202 of FIG. 2. Should microcontroller/microprocessor 104 (FIG. 1) determine that the collective state of the measured voltages corresponds to that below a given threshold value, microcontroller/microprocessor 104 configures the switches (FIG. 1) such that a given battery operating scheme is carried out. For instance, battery 100 of FIG. 1 may include a number of temperature sensors within the enclosure of battery 100, positioned to take temperature readings at various positions within battery 100. Consequently, a switch configuration may be chosen by microcontroller/microprocessor 104 that minimizes use of batteries likely operating at temperatures over a given threshold temperature, thereby reflecting use of capacitors or other batteries likely operating at temperatures below that threshold temperature.

Figure 4:
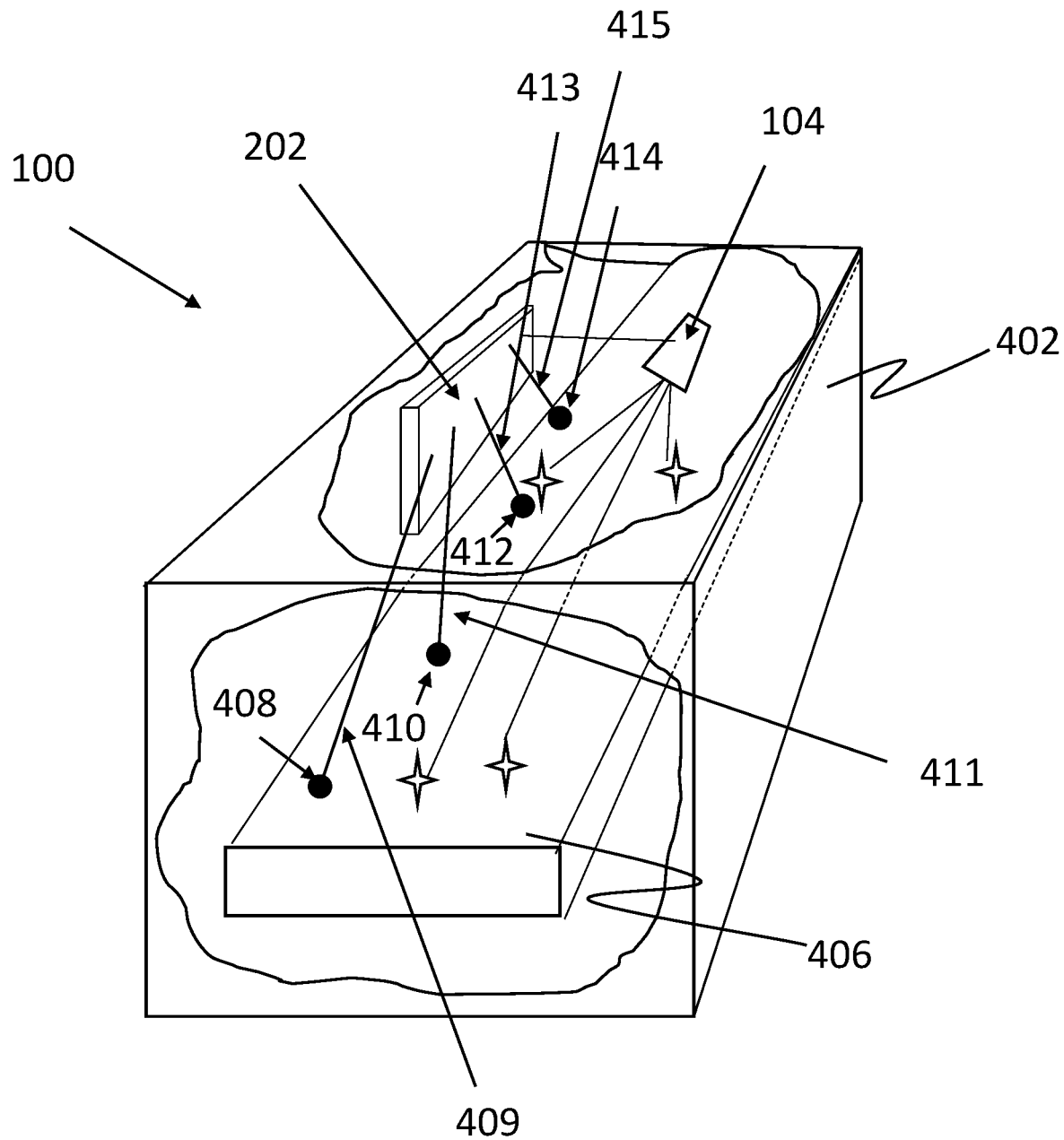
FIG. 4 illustrates a perspective drawing of a battery having an enclosure enclosing an array of battery cells, capacitors and associated switches.

FIG. 4 illustrates a perspective drawing of battery 100 having enclosure 402 enclosing array 406 of battery cells, capacitors and associated switches. Controlled voltage sensor 202 and microcontroller/microprocessor 104 are also illustrated. A few representative positions at which voltage readings may be taken in connection with a capacitor or battery cell on array 406 are shown as voltage collecting devices 408, 410 412 and 414 that are connected to controlled voltage sensor 202 through respective connections 409, 411, 413 and 415 that may be representative, for instance, of a pair of electrically conductive leads. Temperature sensors 420, 422, 424 and 426 (shown as stars) represent exemplary temperature sensors that may be distributed within battery 100 and connected to microcontroller/microprocessor 104 via leads 421, 423, 425 and 427. In some embodiments, connections 409, 411, 413 and 415 to microprocessor/microcontroller 104 may, in fact, be wireless connections through which voltage readings may be accomplished in connection with wireless signals, rather than through wired leads. Temperature sensors, under the control of microcontroller/microprocessor 104, such as temperature sensors 420, 422, 424 and 426, such that a temperature sensor may contain wireless capability and include a wireless transmitter and/or wireless receiver (i.e., wireless temperature sensors) that use, for instance Wi-Fi or Bluetooth® technology to implement wireless connectivity via leads 421, 423, 425 and 427 that may represent wireless connections. In addition, voltage collecting devices 408, 410 412 and 414, under the control of microcontroller/microprocessor 104, may also contain wireless capability (i.e., wireless voltage sensors) and include wireless transmitters and or wireless receivers that use, for instance, Wi-Fi or Bluetooth® technology. As such, in some embodiments, connections 409, 411, 413 and 415 may, in fact, be wireless connections that establish communications between wireless voltage sensors and microcontroller/microprocessor 104. As shown in FIG. 1, transceiver 111 may be optionally (shown in dotted lines) included to transmit (as denoted by the doubled arrow ended dotted line) information back and forth between sensors (including sensors with wireless capability, i.e., a wireless sensor) and microcontroller/microprocessor 104. Transceiver (denoted xceiver in FIG. 1) may be implemented as a single unit or as a unit having a separate transmitter and a separate receiver. In some embodiments, transceiver 111 is a wireless transceiver. Consequently, those embodiments may be implemented as a single unit or as a unit having a separate wireless transmitter and a separate wireless receiver Some embodiments may include temperature sensing capability and voltage reading capability for each battery cell and capacitor in array 406. Such may be accomplished with wired, wireless connections in connection with multiplexed selection by microcontroller/microprocessor 104

Charging a battery that is used to power an external system/device, such as an EV, may require varying energy needs in time. The foregoing battery (labeled 100 throughout) as described herein is also capable of recharging and discharging in different modes based on battery 100's dynamic internal charge. In this respect, battery 100 represents an improvement over any existing electro-chemical battery composed of multiple electro-chemical battery cells.

The foregoing described battery presented herein may be charged by an external DC charger (not shown) in several modes: slow charging mode; fast charging mode; and incremental charging mode as detailed below, with reference to FIGS. 1 and 2:

Slow Charging Mode

Slow charging mode permits the charging of battery cells and associated capacitors along selected columns. With switch S0 closed (switched on); switch S1 opened and, switches between corresponding columns of capacitors and battery cells (i.e., cross switches between capacitors and battery cells in associated columns, such as switches S31, S41, S51 ... SM1) closed; battery electrochemical cells, such as battery cells B11, B21, ... BM1 in column 110, may be slowly and safely charged with relatively low current by a external DC charger connected across input terminals 102 and 105. Switches that may couple an associated column of battery cells to input terminal 102 may be selectively closed and opened. For instance, for column 110, switch S21 and or switch S11 may be closed to charge battery cells in column 110. Microcontroller/microprocessor 104 may control and select the position of switches in each column through multiplexer 206 in order to select columns of battery cells and capacitors for charging. Switches S31 to S3N for each column may be individually switched on or off, to achieve more uniform energy spread within the battery cells and capacitors within corresponding columns of battery cells and capacitors.

Fast Charging Mode

Fast charging mode may be implemented by charging capacitors and not battery cells within battery 100. Switch positions may be selected by multiplexer 206 in connection with microcontroller/microprocessor 104. It is contemplated that multiplexer 206 as referenced throughout may be integrated into microcontroller/microprocessor 104, multiplexing being an integrated function therein. In the fast charging mode, a DC external charger may provide higher charging currents to battery 100 than currents associated with the slow charging mode. Microcontroller/microprocessor 104 causes switches S11 through S1N (i.e., switches connecting capacitors in an associated column of capacitor cells) to close in connection with opening switches S21 through S2N (switches capable of connecting battery cells in an associated column of battery cells), and opening cross switches (i.e., switches S31 through SM1 (switches between associated capacitors) in the first column, and the equivalents in the other columns. Capacitor energy may be later used to directly provide power for the unit requiring power (such as an EV), when the energy in the battery cells is totally depleted so as to power an electric vehicle long enough to reach a charging station. Capacitor energy may also be used to charge battery cells that are partially depleted cells.

Incremental Charging Mode

The incremental charging mode permits charging of capacitors while supplying power. In cases where the battery cells within battery 100 are partially depleted, the capacitors of battery 100 may be incrementally charged while suppling power to a load, such as a unit requiring charge (for instance, an EV). This incremental energy can be used to directly power the device, when the energy in the cells is completely depleted, or can be used to charge the partially depleted cells. Microcontroller/microprocessor 104 causes switches S11 through S1N (i.e., switches capable of connecting capacitors in an associated column of capacitor cells) to close in connection with causing switches S21 to S2N (switches capable of connecting battery cells in an associated column of battery cells) to open. Such switch position selection may be accomplished in conjunction with multiplexer 206. This configuration permits the simultaneous actions of charging capacitors while powering an external device (e.g., an EV) connected across output terminals 107 and 108 in connection with switch S1 being closed.

Battery Cells and Capacitors Powering an External Unit Mode

In this mode, both cells and capacitors may be used to energize an external unit (e.g., an EV) in connection with microcontroller/microprocessor 104 causing switches S11 to S1N, switch S21 to S2N, and switch S1 to close. Should microcontroller/microprocessor 104 cause switch S0 to close, as well, both simultaneous charging of battery cells and capacitors and load (e.g., unit)-powering may be accomplished. In some embodiments, a variation of this mode may be used that allows the battery cells to power the device (e.g., EV), and provide extra power momentarily from the capacitors. This method may be useful for efficiently supplying energy to power an EV and supplementing the energy required by the EV for sudden high acceleration. Since battery cells and capacitors are in parallel for this configuration, capacitors are continuously charged by the battery cells, making them readily available to provide extra energy rapidly.

With reference to FIG. 4, the components of battery 100 within enclosure 402 may serve as a self-contained unit. Consequently, the battery described herein may be adapted for swap-in replacement of an existing battery, thereby upgrading the capability of a receiving EV. The functions of the battery disclosed herein may be controlled by an appropriately programmed microcontroller or a microprocessor, such as is represented by microcontroller/microprocessor 104.

Optimization Modes

Microcontroller/microprocessor 104 may be programmed to carry out optimization schemes/modes of battery operation that deliver maximum power output, conserve energy use, extend battery operating times, etc. in connection with connecting or disconnecting switches to the various capacitors and battery cells of battery 100 according to the selected optimization scheme/mode for either battery charging, battery operation or both.

Charging Stations

Figure 5:
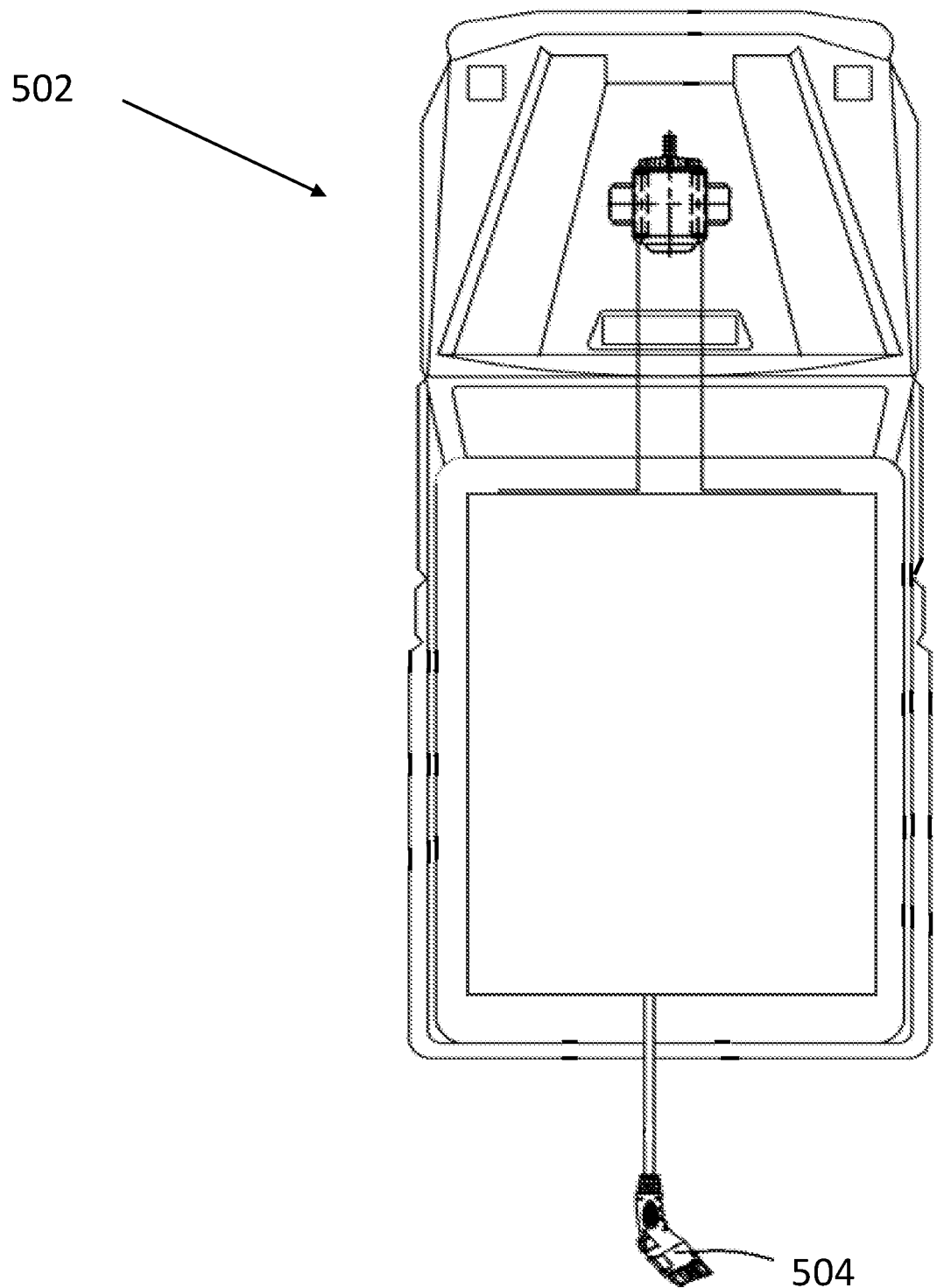
FIG. 5 is a top view of an EV having an energy collecting port that enables external chargers to rapidly provide energy to capacitors within a battery while the EV is in motion or while being stationary for a short time duration.

The battery as disclosed also enables a new and revolutionary charging infrastructure. This infrastructure may facilitate the capability of EVs to rapidly charge "on the fly." FIG. 5 is a top view of EV 502 having energy collecting port 504 that enables external chargers to rapidly provide energy to capacitors within battery 100 (as shown in FIG. 1) while the EV is in motion or while being stationary for short time duration. Energy collecting port 504 may include an internal electromagnetic coil for receiving alternating current (AC) energy by induction from one or more transmitting coils external to the EV. In some embodiments, a single external transmitting coil may be used to charge multiple stationary EVs.

Figure 6:
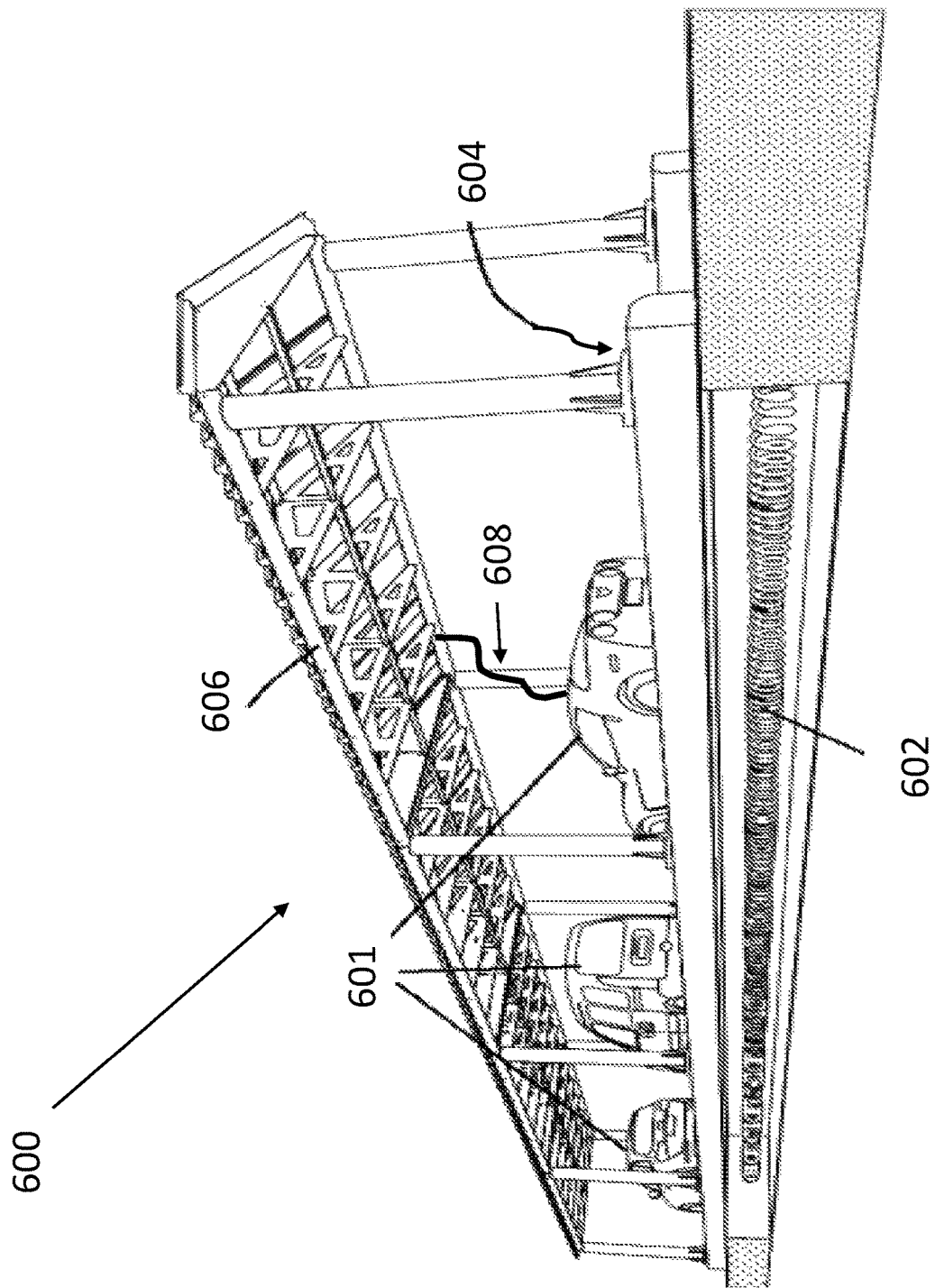
FIG. 6 illustrates a perspective drawing of a vehicle charging station.

FIG. 6 illustrates a perspective drawing of vehicle charging station 600. A conductor may transfer energy from external chargers to a vehicle's internal transitory storage devices (e.g., capacitors and battery cells) of an EV (each shown with reference numeral 601). The conductor may be a coil or external conductive railings located in, above or on road 604, or it may be electrical wiring 606 hung above the road 604 through which energy may be provided via a sliding conductive armature 608 extending out of the vehicle. The wheels of an EV may also link external power sources to a transitory storage device of EV 601.

In the United States and other countries, numerous traditional charging stations are being constructed in the hope they will eventually replace current gas stations. These traditional charging stations require significant include chargers operating from alternating current (AC) voltage sources (e.g., 110 or 220 voltage sources), requiring hours of charging. Internal AC/DC converters may be embedded in each EV to accommodate battery needs of a direct current (DC) charging current. Other chargers may be located in public stations that provide high current DC chargers that require 20-30 minutes of charging time. Vehicle charging station 600 can significantly reduce charging times as compared with charging times associated with existing charging stations that are extended charging times by comparison. Vehicle charging station 600 may be included in a network of other such charging stations to provide and ensure electrical energy to vehicles along a route. Further, such a network may allow an EV to charge while still in motion (i.e., vehicle charging while "on the fly").

Figure 7:
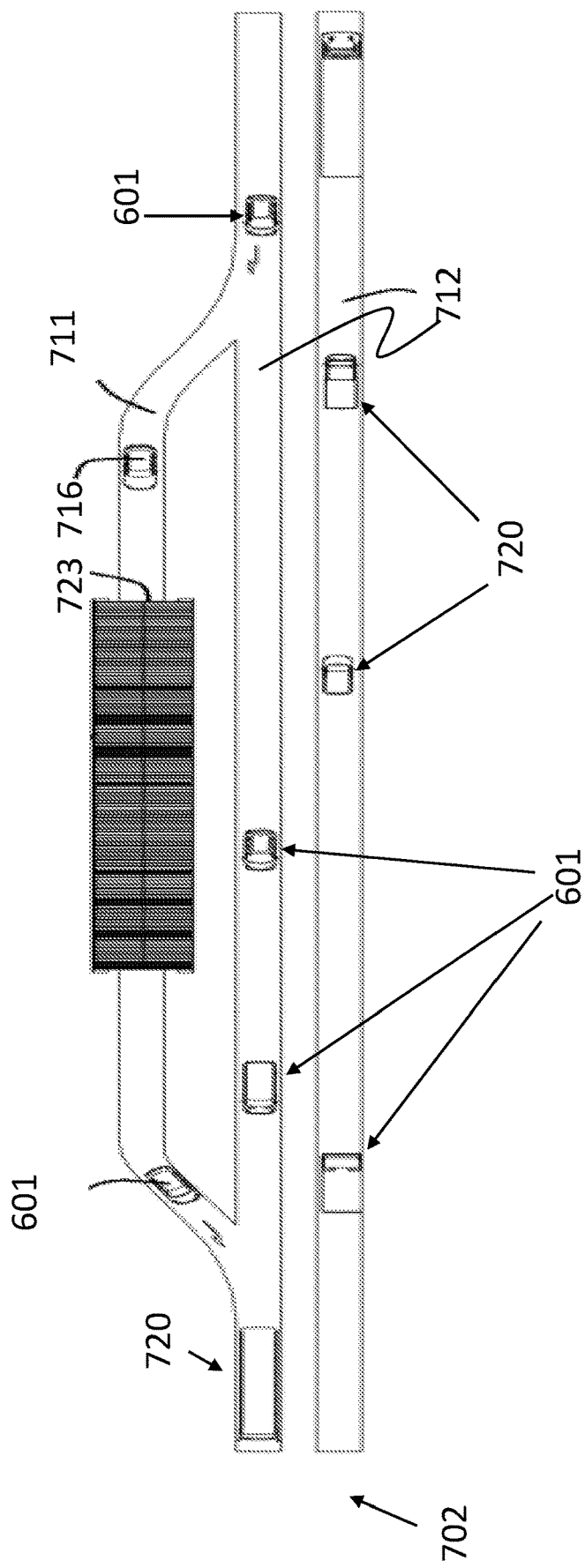
FIG. 7 is a top view that illustrates an "on the fly" station (OTF) and structure that may be constructed along driving routes.

FIG. 7 is a top view that illustrates an "on the fly" station (OTF) and structure that may be constructed along driving routes 702. A side road 711 separate from main road 712 will direct EV 716 to an elongated structure 723 where it will rapidly charge the capacitors of battery 10 (FIG. 1). As illustrated in FIG. 7, EVs 601 among non-electric vehicles 720 may be charged while in motion, or while being stationary for a short time, to enable charging of the vehicle's battery. Alternatively, several vehicles may park along a driving path while their batteries are being charged during a short time duration. The electrical charge should be sufficient to allow the EV to drive to either another OTF station, or to a charging station where a slow full battery charge may be obtained.

These OTF stations can be placed in structures located in cities as well. Slow charging of the battery cells of battery 100 (FIG. 4) and quick charging of the capacitors of battery 100 may be constructed to replace the current day gas stations and charging stations.

The transitory storage device is also capable to serve as a booster by providing excess electrical energy to the motor in short amount of time, while the battery alone cannot discharge sufficiently fast. In our structure the battery provides the required energy for normal driving conditions, and the transitory storage device is operated only when higher acceleration mode is detected. When the battery is totally depleted, the transitory storage device provides the required energy for driving an additional distance on its own.

Although the disclosure herein references both capacitors and battery cells with the battery cells having primacy in delivering power, it is contemplated that other devices besides capacitors may be used wherein those devices have primacy in delivering power.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another or may be combined in various ways. All possible combinations and sub-combinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

Although the description provided herein references closed and open switches in a manner that may indicate a switch that which is normally open, embodiments are also contemplated for instance in which a switch is normally closed.

The foregoing may be accomplished through software code running in one or more processors on a communication device in conjunction with a processor in a server running complementary software code.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

It is appreciated that in order to practice the method of the foregoing as described above, it is not necessary that the processors and/or the memories of the processing machine be physically located in the same geographical place. That is, each of the processors and the memory (or memories) used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the foregoing, be performed by a single component. Further, the processing performed by one distinct component as described above may be performed by two distinct components. In a similar manner, the memory storage performed by two distinct memory portions, as described above, may, in accordance with a further embodiment of the foregoing, be performed by a single memory portion. Further, the memory storage, performed by one distinct memory portion, as described above, may be performed by two memory portions.

Further, various technologies may be used to provide communication between the various processors and/or memories, as well as to allow the processors and/or the memories of the foregoing to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the foregoing. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software may instruct the processing machine what to do with the data being processed.

Further, it is appreciated that the instructions or set of instructions used in the implementation and operation of the foregoing may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the foregoing. Illustratively, the programming language used may include assembly language, Ada, APL, Basic, C, C++, COBOL, dBase, Forth, Fortran, Java, Modula-2, Pascal, Prolog, Python, REXX, Visual Basic, and/or JavaScript, for example. Further, it is not necessary that a single type of instruction or single programming language be utilized in conjunction with the operation of the system and method of the foregoing. Rather, any number of different programming languages may be utilized as is necessary and/or desirable.

Also, the instructions and/or data used in the practice of the foregoing may utilize any compression or encryption technique or algorithm, as may be desired. An encryption module might be used to encrypt data. Further, files or other data may be decrypted using a suitable decryption module, for example.

As described above, the foregoing may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the foregoing may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the foregoing.

Further, the memory or memories used in the processing machine that implements the foregoing may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the foregoing, a variety of "user interfaces" may be utilized to allow a user to interface with the processing machine or machines that are used to implement the foregoing. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the foregoing, it is not necessary that a human user actually interact with a user interface used by the processing machine of the foregoing. Rather, it is also contemplated that the user interface of the foregoing might interact, i.e., convey and receive information, with another processing machine, rather than a human user. Accordingly, the other processing machine might be characterized as a user. Further, it is contemplated that a user interface utilized in the system and method of the foregoing may interact partially with another processing machine or processing machines, while also interacting partially with a human user.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

I claim:

1. A battery, comprising:
a processor;
a plurality of battery cells;
a plurality of capacitors;
a plurality of terminals; and
a multiplexer;
a plurality of voltage sensors coupled to the ones of the plurality of battery cells, each voltage sensor configured to detect a battery cell voltage; and
a plurality of switches, configured by the processor, to removably connect, as a consequence of a battery cell voltage threshold, in connection with the multiplexer, ones of the plurality of battery cells and ones of the plurality of capacitors to ones of the plurality of terminals, wherein the plurality of switches are further configured to cause the ones of the plurality of capacitors to supply power to augment or serve in place of the ones of the plurality of battery cells in connection with the ones of the plurality of battery cells becoming partially depleted.

2. The battery, as recited in claim 1, wherein the processor is a microprocessor or a microcontroller.

3. The battery, as recited in claim 1, further comprising an enclosure enclosing the processor, the plurality of battery cells, the plurality of capacitors, the plurality of terminals, the multiplexer and the plurality of switches.

4. The battery, as recited in claim 1, wherein each switch from the plurality of switches consists of a FET switch, MOSFET switch, bipolar transistor switch, a power MOSFET switch and a combination thereof.

5. The battery, as recited in claim 1, further comprising a plurality of temperature sensors coupled to the ones of the plurality of battery cells.

6. The battery, as recited in claim 5 wherein ones of the plurality of temperature sensors include a wireless temperature sensor.

7. The battery, as recited in claim 6 wherein each wireless temperature sensor includes a wireless transmitter and a wireless receiver.

8. The battery, as recited in claim 1, further comprising a transceiver coupled to the processor.

9. The battery, as recited in claim 8, wherein the transceiver includes a transmitter and a separate receiver.

10. The battery, as recited in claim 1 wherein the voltage sensors are controlled by the processor.

11. The battery, as recited in claim 1 wherein ones of the plurality of voltage sensors include a wireless voltage sensor.

12. The battery, as recited in claim 11 wherein the wireless voltage sensor includes a wireless transmitter and a wireless receiver.

13. The battery, as recited in claim 1 wherein the plurality of capacitors is a plurality of supercapacitors.

14. A method of operating a battery, comprising:
detecting charge on a plurality of battery cells;
coupling and/or decoupling ones of the plurality of battery cells to ones of a plurality of terminals of the battery, through a plurality of switches, in connection with a multiplexer;
coupling and/or decoupling ones of a plurality of capacitors to ones of the plurality of terminals of the battery, through a plurality of switches, in connection with the multiplexer, ones of the plurality of capacitors serving to augment power or supply power in place of the ones of the plurality of battery cells in connection with detecting charge depletion of the ones of the plurality of battery cells; and
controlling the multiplexer using a processor.

15. The method of operating a battery as recited in claim 14, further comprising:
sensing voltage levels on the ones of the plurality of battery cells;
wherein decoupling the ones of the plurality of battery cells from the ones of the plurality of terminals occurs in connection with the ones of the plurality of battery cells having voltages below a threshold; and
wherein coupling the ones of a plurality of capacitors to the ones of a plurality of terminals occurs in connection with associated ones of the plurality of battery cells having the voltages below the threshold;
powering a load using the ones of a plurality of capacitors coupled to the ones of the plurality of terminals.

16. The method of operating a battery as recited in claim 15, further comprising:
charging the ones of the plurality of capacitors coupled to the ones of the plurality of terminals.

17. The method of operating a battery as recited in claim 14, further comprising:
charging the ones of the plurality of capacitors coupled to the ones of the plurality of terminals;
charging the ones of the plurality of battery cells coupled to the ones of the plurality of terminals; and
powering a load using the ones of a plurality of capacitors and the ones of the plurality of battery cells coupled to the ones of the plurality of terminals.

18. The method of operating a battery as recited in claim 17, wherein the load is an electric vehicle.

19. A computer-readable, non-transitory, programmable product, comprising code, executable by a processor, for causing the processor to
cause a voltage detector to detect charge on a plurality of battery cells;
cause a multiplexer to couple and/or decouple ones of a plurality of battery cells to ones of a plurality of terminals, through a plurality of switches, in connection with a multiplexer;
cause a multiplexer to couple and/or decouple ones of a plurality of capacitors to ones of the plurality of terminals, through the plurality of switches, in connection with the multiplexer, ones of the plurality of capacitors serving in place of the ones of the plurality of battery cells in connection with detection of charge depletion from the ones of the plurality of battery cells; and
cause the processor to control the multiplexer.

20. The method of operating a battery as recited in claim 14, the method further comprising charging the battery while the battery is powering an electric vehicle that is in motion on a road through a first on-the-run charging station;
coupling one selected from the group consisting of a conductor disposed over the road, a conductor disposed under the road, a coil under the road and a coil above the road to the charging station; and
charging ones of a plurality of capacitors coupled to the ones of the plurality of terminals and optionally charging ones of the plurality of the battery cells coupled to the ones of the plurality of terminals,
wherein the charging of the capacitors is sufficient to power the electric vehicle to reach one of a secondary on-the-run charging station, and a traditional charging station configured to charge at least one the plurality the battery cells of the plurality of the battery cells.

* * * * *